US010049468B2

United States Patent
Finkel et al.

(10) Patent No.: US 10,049,468 B2
(45) Date of Patent: Aug. 14, 2018

(54) IMAGE RECONSTRUCTION FOR COMPUTED TOMOGRAPHY

(71) Applicant: Arineta Ltd., Caesarea (IL)

(72) Inventors: Amir Finkel, Zikhron-Yaakov (IL); Shai Wald, Haifa (IL)

(73) Assignee: Arineta Ltd., Caesarea (IL)

( * ) Notice: Subject to any disclaimer, the term of this patent is extended or adjusted under 35 U.S.C. 154(b) by 0 days.

(21) Appl. No.: 15/528,125

(22) PCT Filed: Nov. 26, 2014

(86) PCT No.: PCT/IL2014/051024
§ 371 (c)(1),
(2) Date: May 19, 2017

(87) PCT Pub. No.: WO2016/084059
PCT Pub. Date: Jun. 2, 2016

(65) Prior Publication Data
US 2017/0330355 A1    Nov. 16, 2017

(51) Int. Cl.
*G06K 9/00* (2006.01)
*G06T 11/00* (2006.01)
*A61B 6/00* (2006.01)

(52) U.S. Cl.
CPC .......... *G06T 11/005* (2013.01); *G06T 11/006* (2013.01); *G06T 2211/421* (2013.01); *G06T 2211/424* (2013.01)

(58) Field of Classification Search
CPC ................... G06T 11/00; A61B 3/00
USPC ....... 382/128, 129, 130, 131, 132, 133, 134; 378/4, 8, 21
See application file for complete search history.

(56) References Cited

U.S. PATENT DOCUMENTS 6,996,204 B2 * 2/2006 Grass .................. A61B 6/032
378/15
7,809,102 B2   10/2010 Brada et al.
(Continued)

FOREIGN PATENT DOCUMENTS

| EP | 0989521 | 3/2000 |
| WO | WO 2009/153683 | 12/2009 |
| WO | WO 2016/084059 | 6/2016 |

OTHER PUBLICATIONS

International Preliminary Report on Patentability Dated Jun. 8, 2017 From the International Bureau of WIPO Re. Application No. PCT/IL2014/051024. (8 Pages).
(Continued)

*Primary Examiner* — Abolfazl Tabatabai

(57) ABSTRACT

A method for volumetric image reconstruction of data collected from a plurality of radiation beams emitted from axially offset positions includes receiving projection data from at least two radiation beams emitted from axially offset positions, defining a first boundary between a first region irradiated only by a first beam of the at least two radiation beams and a second region irradiated by both the first beam and a second beam of the at least two radiation beams, defining a weighting function as a function of the first boundary, and reconstructing a volumetric image from the data that is weighted with the weighting function. Each beam moves on a circular trajectory and radiates at a plurality of view angles over the circular trajectory.

20 Claims, 6 Drawing Sheets

(56) References Cited

U.S. PATENT DOCUMENTS 7,869,561 B2 * 1/2011 Dafni .................... A61B 6/032
378/19
2004/0076265 A1 4/2004 Heuscher et al.

OTHER PUBLICATIONS

International Search Report and the Written Opinion Dated Aug. 13, 2015 From the International Searching Authority Re. Application No. PCT/IL2014/051024.

Baek et al. "A New Method to Combine 3D Reconstruction Volumes for Multiple Parallel Circular Cone Beam Orbits", Medical Physics, XP012144703, 37(10): 5351-5360, Sep. 21, 2010. Abstract, Fig.3, Section II.A.

Engel et al. "X-Ray Scattering in Single- and Dual-Source CT", Medical Physics, XP012115694, 35(1): 318-332, Dec. 26, 2007. Section V.D.

Feldkamp et al. "Practical Cone-Beam Algorithm", Journal of the Optical Society of America A, JOSA A, 1(6): 612-619, Jun. 1984.

Yang et al. "Fast Exact/Quasi-Exact FBP Algorithms for Triple-Source Helical Cone-Beam CT", IEEE Transactions on Medical Imaging, XP011284979, 5(3): 756-770, Mar. 1, 2010. Abstract, Fig.5.

Yin et al. "3D Analytic Cone-Beam Reconstruction for Multiaxial CT Acquisitions", International Journal of Biomedical Imaging, 2009(Article ID 538389): 1-11, 2009.

\* cited by examiner

FIG. 6A  FIG. 6B 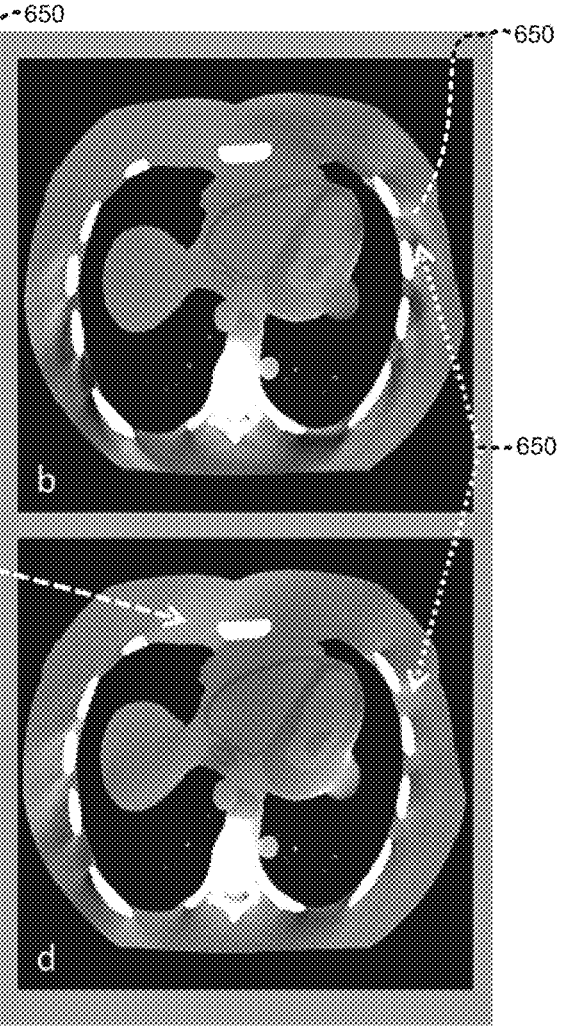
FIG. 6C  FIG. 6D

IMAGE RECONSTRUCTION FOR COMPUTED TOMOGRAPHY

RELATED APPLICATIONS

This application is a National Phase of PCT Patent Application No. PCT/IL2014/051024 having International filing date of Nov. 26, 2014, the contents of which are incorporated by reference as if fully set forth herein in their entirety.

FIELD AND BACKGROUND OF THE INVENTION

The present invention, in some embodiments thereof, relates to image reconstruction of image data from a plurality of radiation sources and, more particularly, but not exclusively, to image reconstruction for computed tomography (CT).

Methods for imaging an examination object with a CT system are generally known. Projections emitted by the X-ray source can be shaped into a two dimensional (2D) fan shaped beam or a three dimensional (3D) cone shaped beam. Radiation emitted by the X-ray source is attenuated by the examination object and detected by the detector. In known methods an X-ray source and an opposing detector rotate around the examination object while the detector acquires data from a series of projections captured at different angles with respect to the examination object. Output from the detector is processed by reconstruction methods to provide sectional images through the examination object.

Filter Back-Projection (FBP) algorithm is a known reconstruction method used for reconstructing fan beam acquired data. The reconstruction algorithm used for reconstructing cone beam acquired data is usually of the type called "Feldkamp" or "FDK" method or modifications of the FDK method. The FDK method was published by L. A. Feldkamp, L. C. Davis, and J. W. Kress, JOSA A, Vol. 1, Issue 6, pp. 612-619 (1984), the content of which incorporated herein by reference. The reconstructed images obtained by these methods are known to have artifacts that worsen for cone beam angles that are distanced from the mid plane (the source trajectory plane) due to "data incompleteness". For wide angle cone beams, the artifacts that are produced are known to be significant. Similar problems occur with other cone beam reconstruction algorithms known in the art.

It is also known to scan with a plurality of axial offset X-ray sources or to perform a plurality of axially offset scans with a single source, both for increasing the completeness of the data acquired. Typically, the axial offset provides overlap between the projected cone beams. For overlapping cone beams, a weighting method is required to combine the data obtained from the difference sources. Weighting can be performed on the data captured from the detector on a per view basis during image reconstruction or after image reconstruction, on data acquired from each of the sources. An exemplary dual source CT scanner and method is described for example in U.S. Pat. No. 7,869,561 entitled "CONE-BEAM CT," assigned to Arineta Ltd., the content of which is incorporated herein by reference.

A publication entitled "A new method to combine 3D reconstruction volumes for multiple parallel circular cone beam orbits" by J. Baek and N. J. Pelc that was published in Medical physics, vol. 37, no. 10 pp. 5351-5360 (2010) content of which is incorporated herein by reference, describes a method for reconstructing data from a plurality of X-ray sources. It is described that the cone beam projection data of each orbit are separately reconstructed using the FDK algorithm. Subsequently, overlap regions of the reconstructed image volumes are combined using weighted averaging in frequency space. A smoothly varying weighting function in the overlap region is used to avoid image artifacts caused by the abrupt transition in frequency space.

One known disadvantage of applying weighting after image reconstruction is that only volume elements (voxels) that have sufficient angular coverage by a given source can provide an image voxel for that source. For example, it is known that FBP reconstruction can be applied only to voxels that are irradiated from at least 180° plus the beam fan angle. As a result, some of the acquired data is not used in reconstruction and dose efficiency of the scanner is reduced. FIG. 6C shows an exemplary image reconstructed by weighting an image formed separately from each source. Reconstruction by this method can also be seen to include artifacts 651.

U.S. Pat. No. 6,996,204 entitled "Sequential computed tomography method," the contents of which is incorporated herein by reference describes a computed tomography method in which an examination zone is irradiated over a full rotation of the source and detector, from two mutually offset, preferably circular source trajectories. In an intermediate region the absorption distribution is reconstructed by combining measurement values from both trajectories with weights. The weight for a particular voxel is a function of a distance between the voxel to be reconstructed and the relevant trajectory. The weight is increased as the distance between the voxel to be reconstructed and the relevant trajectory decreases. This method requires obtaining scan data over at least 360 degrees.

A publication entitled "3D analytic cone-beam reconstruction for multiaxial CT acquisitions" by Z. Yin, B. De Man, and J. Pack that was published in International journal of Biomedical imaging, vol. 2009, ID 538389, (2009), the content of which is incorporated herein by reference, describes a methods for reconstruction data from multiple axial sources for both full 360 degrees and partial scans 180 degrees plus fan angle. For the partial scan geometry, the described method uses a view based weighting in order to combine the data from the different sources during reconstruction. The weighting described is determined according to the cone angle between each voxel and each source, with feathering at the borders between regions in order to avoid weight discontinuities.

FIG. 2 shows a simplified schematic illustration of a cross sectional view of two radiation sources irradiating a volume of interest (VOI) and a corresponding example of a prior art linear weighting function used for image reconstructing. In some known methods, the weight of data obtained from each source S1 and S2 at each voxel in a VOI 150 is calculated according to its cone angle or distance from a source plane of S1 and S2. Typically, VOI 150 includes a region A irradiated only by S1, a region B irradiated only by S2 and a region C irradiated by both S1 and S2. Typically, regions A, B and C change with view angle of the scanner. In some known methods, the weighting function for each of S1 and S2 within region C is defined as a linearly varying function that depends on cone angle or distance from the source plane while the weighting function in each of regions A and B is required to be equal to 0 or to 1. Typically, the slope is defined such that the weighting functions at source planes 101 and 102 equal 1 or 0. Since, source planes 101 and 102 are typically within regions A and B respectively and displaced from the boundaries, e.g. $Z_{AC}$ and $Z_{BC}$ that separate regions A, B and C, there are discontinuities in the weighting function at the boundaries and/or the crossover between region C and each of regions A and B. The sudden transitions in the weighting function are known to introduce image artifacts. It is known to use feathering to reduce these image artifacts.

In the example shown in FIG. 2, the weights associated with each source are plotted along the Z direction at two different Y voxel coordinates. The weighting functions 161, 162 and 171,172 represent weighting functions calculated as a function of cone angle or distance from the source planes 101, 102 as is known in the art. Discontinuities in the weighting functions at the boundary crossing are shown. Typically, these transitions are more pronounced as the distance from detector 106 increases. For example, the transitions in weighting functions 161 and 162 are more pronounced than the transitions in weighting functions 171 and 172 defined for a plane that is closer to detector 106. Known methods apply feathering, e.g. feathering 161', 162', 171', 172'. FIG. 2 also shows exemplary weighting functions 181, 182 associated with each source S1, S2 at an exemplary Z coordinate and along a Y direction. Typically, for linearly varying weight functions along the Z direction, the weight functions along the Y direction are constant. Typically, feathering is also applied along the Y direction.

An example of image artifacts that develop due to discontinuity of the weighting function at boundary regions, e.g. when feathering is not applied is shown in FIG. 6A. Typically, when feathering is not applied, the discontinuity of the weighting function leads to artifacts, e.g. artifact 650 in FIG. 6A. FIG. 6B shows an exemplary image reconstructed with feathering. Typically, artifact 650 is less pronounced although still apparent when feathering is applied.

SUMMARY OF THE INVENTION

According to some embodiments of the present invention, there is provided a method for image reconstruction of data collected from a plurality of axially offset radiation sources and/or from a plurality of axially offset scans using an improved weighting function for combining the data collected from the different axial positions. According to some embodiments of the present invention, the data collected from the different axial positions are combined on a per view basis. According to some embodiments of the present invention, the method can be integrated with various methods for image reconstruction of data collected from a single source.

An aspect of some embodiments of the present invention provides for a method for volumetric image reconstruction of data collected from a plurality of radiation beams emitted from axially offset positions, each beam moving on a circular trajectory, the method comprising: receiving projection data from at least two radiation beams emitted from axially offset positions, each beam radiating at a plurality of view angles over the circular trajectory; defining a first boundary between a first region irradiated only by a first beam of the at least two radiation beams and a second region irradiated by both the first beam and a second beam of the at least two radiation beams; defining a weighting function as a function of the first boundary; and reconstructing a volumetric image from the data that is weighted with the weighting function.

Optionally, the first boundary is defined on a per view basis.

Optionally, the weighting function in the second region is defined to vary as a function of a length and/or extent of the second region along the direction of an axis of rotation of the circular trajectory.

Optionally, the weighting function is defined to be continuous across the first and second regions, absent feathering.

Optionally, the method includes defining a second boundary between the second region and a third region, the third region irradiated only by the second beam and defining the weighting function as a function of both the first boundary and the second boundary that is continuous across the first and second regions, absent feathering.

Optionally, the weighting function is defined to vary linearly either from 1 to 0 or from 0 to 1 in the second region.

Optionally, the second boundary is defined on a per view basis.

Optionally, the at least two radiation beams are cone beams.

Optionally, the volumetric image is reconstructed with data collected over 180 degrees plus a fan angle of the beams.

Optionally, the volumetric image is reconstructed with data collected over less than 360 degrees.

Optionally, the volumetric image is reconstructed with data collected over at least 360 degrees.

Optionally, a filtered back projection method is applied to reconstruct the volumetric image from the data that is weighted.

Optionally, iterative reconstruction is applied to reconstruct the volumetric image.

Optionally, one or more radiation sources and at least one detector array are mounted on a support rotor that rotates about a rotation axis of the circular trajectory, for capturing the projection data at the plurality of view angles.

Optionally, the projection data is received from at least two axially offset radiation sources that rotate together.

Optionally, the at least two axially offset radiation sources are offset in a direction of an axis of rotation of the circular trajectory.

Optionally, the projection data from the at least two axially offset radiation sources is received by a same detector array.

Optionally, the detector array alternates between receiving data from each of the at least two axially offset radiation sources.

Optionally, the data from each of the at least two radiation beams is received consecutively using a single source that is moved in the axial direction.

Optionally, the at least two radiation beams are offset in a direction of an axis of rotation of the circular trajectory.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

BRIEF DESCRIPTION OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 6A, 6B and 6C are exemplary images reconstructed with known reconstruction methods; and FIG. 6D is an exemplary image reconstructed with a reconstruction method in accordance with some embodiments of the present invention.

DESCRIPTION OF SPECIFIC EMBODIMENTS OF THE INVENTION

The present invention, in some embodiments thereof, relates to image reconstruction of image data from a plurality of radiation sources and, more particularly, but not exclusively, to image reconstruction for computed tomography (CT).

According to some embodiments of the present invention, there is provided an improved method for combining data from different radiation sources and/or from different axial positions during stages of image reconstruction and for generating images with the combined data. According to some embodiments of the present invention, a new weighting technique is proposed for combining the data from different sources and/or positions. According to some embodiments of the present invention, the weighting technique is applied on a per view basis. According to some embodiments of the present invention, the new weighting technique is suitable for both full and partial scan reconstruction. According to some embodiments of the present invention, weights for combining voxel data obtained from the different sources are not defined based on cone angle. Rather, according to some embodiments of the present invention, locations of boundaries and/or seams between volumes irradiated by different sources are identified and position of an image voxel in relation to the boundaries defines the weight for that voxel. According to some embodiments of the present invention, the boundaries are identified for each projection and/or view angle and the weights are defined based on the identified boundaries.

According to some embodiments of the present invention, the weighting function for each source is defined to be continuous throughout the VOI. Due to the continuous nature of the weighting function, feathering is not required. The present inventors have found that the method for image reconstruction disclosed herein may require less processing time as compared to other known methods and also may provide improved image quality with fewer artifacts. FIG. 6D shows an exemplary image reconstructed by methods described herein. The present inventors have found that the reconstructed image is generally enhanced and/or includes fewer artifacts as compared to images reconstructed by other known methods, e.g. images in FIGS. 6A-6C.

Iterative processes for reconstructing an image from CT are known. Typically, an iterative process starts with an assumed image, computes projections from the assumed image, compares the original projection data and updates the image based upon the difference between the calculated and the actual projections. According to some embodiments of the present invention, a weighting process as described herein is used in at least one iteration of an iterative reconstruction process.

Figure 1:
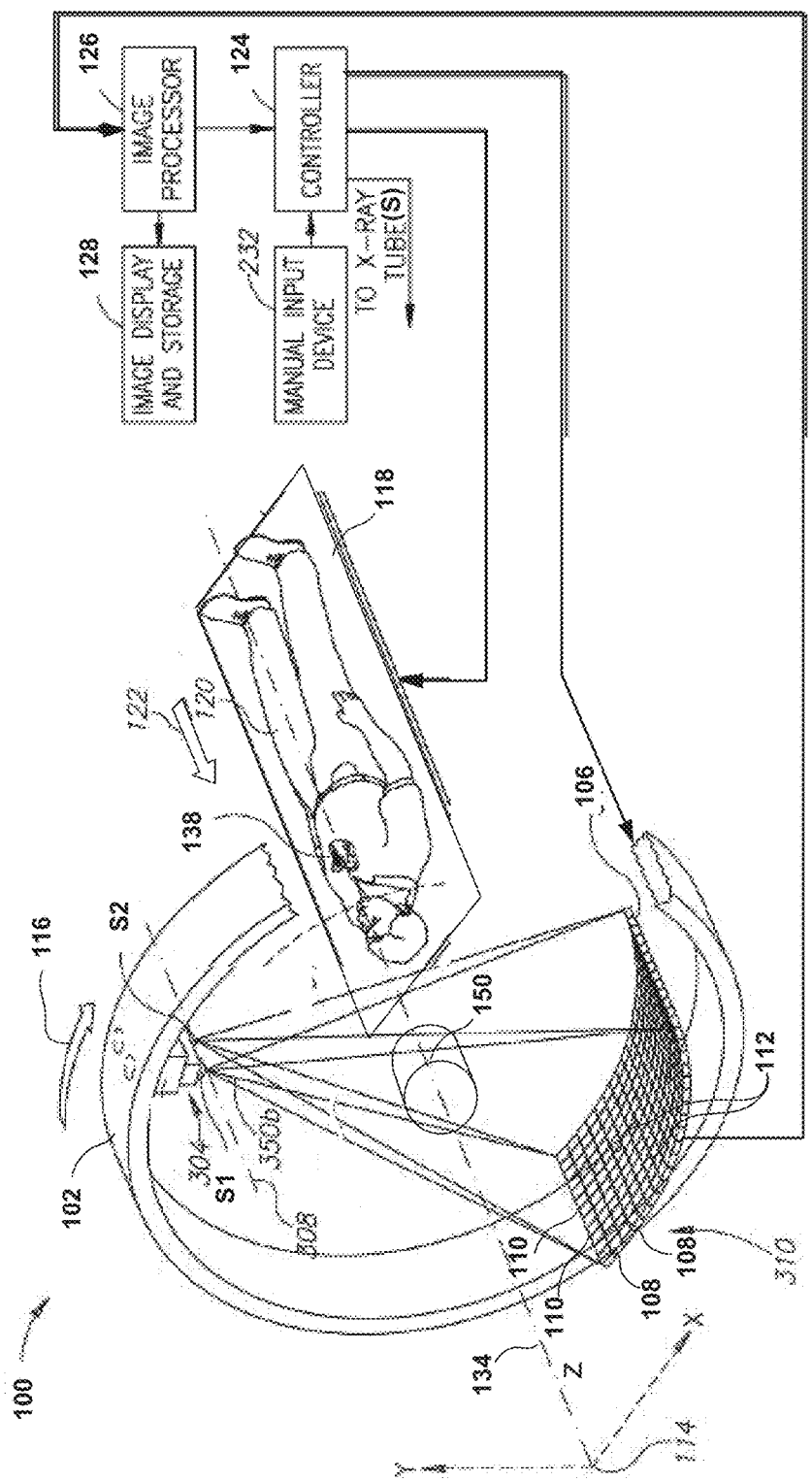
FIG. 1 is a schematic illustration of a prior art CT imaging system that can be used with embodiments of the present invention.
Figure 3:
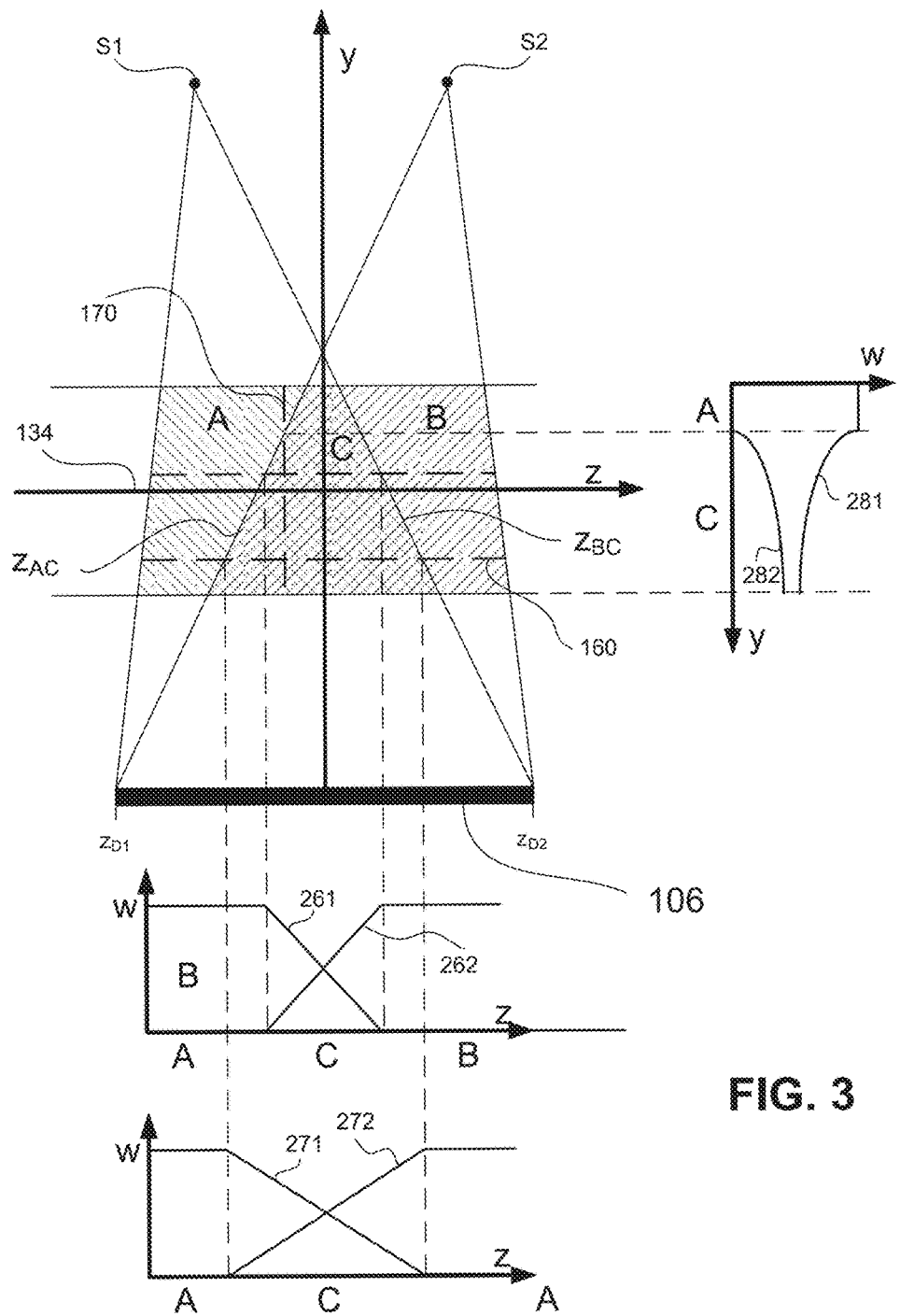
FIG. 3 is a simplified schematic illustration showing a cross sectional view of two radiation sources irradiating a VOI and corresponding exemplary weighting functions used for image reconstructing in accordance with some embodiments of the present invention.
Figure 4:
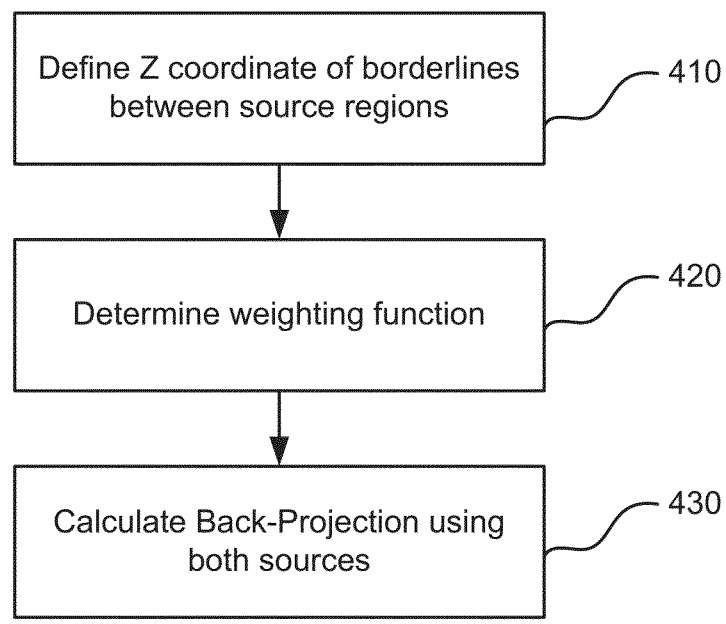
FIG. 4 is a simplified flow chart of an exemplary method for combining back-projected data from two sources in accordance with some embodiments of the present invention.
Figure 5:
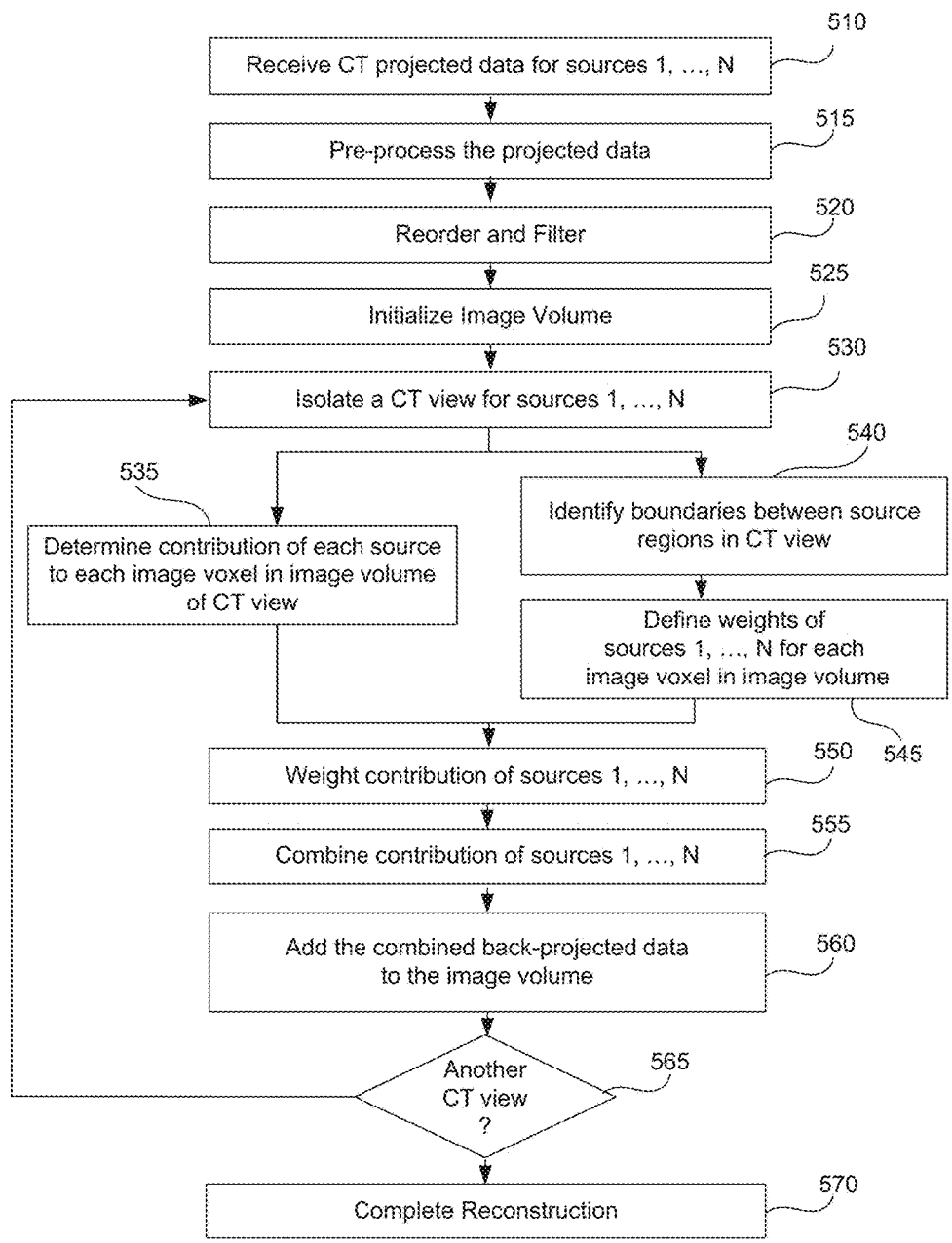
FIG. 5 is a simplified flow chart of an exemplary method for image reconstruction using a back projection method in accordance with some embodiments of the present invention.

For purposes of better understanding some embodiments of the present invention, as illustrated in FIG. 3-5 of the drawings, reference is first made to the general construction and operation of a CT imaging system as illustrated in FIG. 1. FIG. 1 is a schematic illustration of some basic features of a dual source CT scanner 100 used for medical imaging, most features, other than the sources, are also typical for a conventional single source CT scanner. CT scanner 100 typically comprises a support rotor 102 mounted on a gantry (not shown) that carries X-ray sources S1 and S2 and a detector array 106, the latter being comprised of a plurality of rows 108 and columns 110 of closely spaced X-ray detector elements 112. Support rotor 102 is arranged for rotation in a direction indicated by an arrow 116 around a rotational axis coinciding with the Z-axis 134 of a coordinate system indicated by coordinate icon 114. It should be noted that coordinate system 114 rotates with rotor 102 so the Y axis remains pointing from the center of rotation to X ray sources S1 and S2 while the system is rotating.

A movable platform 118 is arranged to transport a patient 120 (or, more generally, an object being inspected) along the scanner Z-axis as indicated by arrow 122. A system controller 124 controls the operation of rotor 102, X-ray sources S1 and S2, platform 118, as well as an image processor 126 connected to an output of detector array 106, and a display and storage unit 128. Typically, a manual input device 232 also provides input to controller 124. X-ray sources S1 and S2 are axially spaced along a line 308 parallel to an axis of rotation 134. X-ray sources S1 and S2 may be provided by separate X-ray tubes or by two focal spots of single tube.

During operation of CT scanner 100, a patient is positioned so that an object 138 under inspection coincides with a VOI 150. Cross sectional axial images or slices of VOI 150, are created by computer processing of X-ray attenuation data acquired at multiple view angles around axis of rotation 134. Attenuation data from the detector elements 112 is gathered for a succession of angular positions (or view angles), typically in the range of about 180 plus the fan angle to about 360 degrees or more, as rotor 102 carries sources S1, S2 and detector array 106 around subject 120. In dual source CT scanner 100 the sources S1 and S2 typically alternate and attenuation data is acquired for each source separately.

Alternatively, when a single cone beam scanner is used, overlapping data is acquired by first acquiring data for one source plane and then moving the scanned subject in the Z direction to acquire a second set of data for a second source plane. In some exemplary embodiments of the present invention, a dual CT scanner can be used to first acquire data from two source planes and a scanned subject (and/or examination object) can be moved relative to the sources in the Z direction to acquire two additional sets of data.

The data collected from all the detector elements for all the viewing angles at a fixed axial position, generally referred to as projections, are computer-processed by image processor 126 to reconstruct one or more two-dimensional slice images. The slice images are displayed and stored by display and storage unit 128, which may include a computer monitor, or of any other desired and suitable display type, and a suitable data storage unit. In the case of a cone beam, a three-dimensional image may be created from the reconstructed axial slices.

For imaging of whole organs, and particularly in cardiac imaging, using a pair of cone beams can be advantageous. X-ray sources S1 and S2 radiate cone beams that combine to form a generally cylindrical VOI 150 that may be large enough to produce a three-dimensional image of good resolution of the entire heart without changing the axial position of the subject support platform during operation. Data from radiation generated by multiple beams may be captured substantially over the same area of a common detector array.

Referring now to the drawings, FIG. 3 shows a simplified schematic diagram of cross sectional view of two radiation sources irradiating a VOI and corresponding exemplary weighting functions used for image reconstructing in accordance with some embodiments of the present invention. As stated in reference to FIG. 2, VOI 150 irradiated by two radiation sources includes region A irradiated only by S1, region B irradiated only by S2 and region C irradiated by both S1 and S2. Typically as is also known in the prior art, data obtained from S1 receives a weight, w=1 in region A and w=0 in region B, while data obtained from S2 receives a weight w=0 in region A and w=1 in region B. Typically, the weight, w defines percentage of the intensity contribution to the image of a voxel of each of attenuation data acquired for radiation from S1 and S2.

According to some embodiments of the present invention, a weighting function for combining projection data from S1 and S2 is defined to be continuous throughout regions A, B and C, and monotonic and differentiable within region C. According to some embodiments of the present invention, the weighting function for each source is defined along the Z direction and unlike the prior art, varies in region C as a function of a length and/or extent of region C along a Z direction.

Exemplary linear weighting functions 261 and 271 for S1 along the Z direction are defined to be equal to 1 across regions A, to vary linearly from 1 to 0 across region C and to be equal to 0 across region B. In a similar manner, exemplary weighting functions 262 and 272 for S2 are defined to be equal to 0 across region A, to vary linearly from 0 to 1 across region C and to be equal to 1 across region B. Typically, the slopes of the linearly varying portions of the weighting functions depend on a length and/or extent of region C along the Z direction, for a given height along the Y direction. For example, the slopes of the linearly varying portions of weighting functions 261 and 262 defined at one particular Y coordinate are steeper than those of weighting functions 271 and 272 defined at another particular Y coordinate that is closer to detector 106. Alternatively, a differential portion of the weighting functions 261, 262, 271 and 272 are defined to vary in a non-linear manner. Optionally, different weighting functions are defined for different Y coordinates and/or for different views. Optionally, a linearly varying weighting function is defined from some Y coordinates and/or some views and a non-linearly varying weighting function, e.g. a polynomial or exponential varying function.

Figure 2:
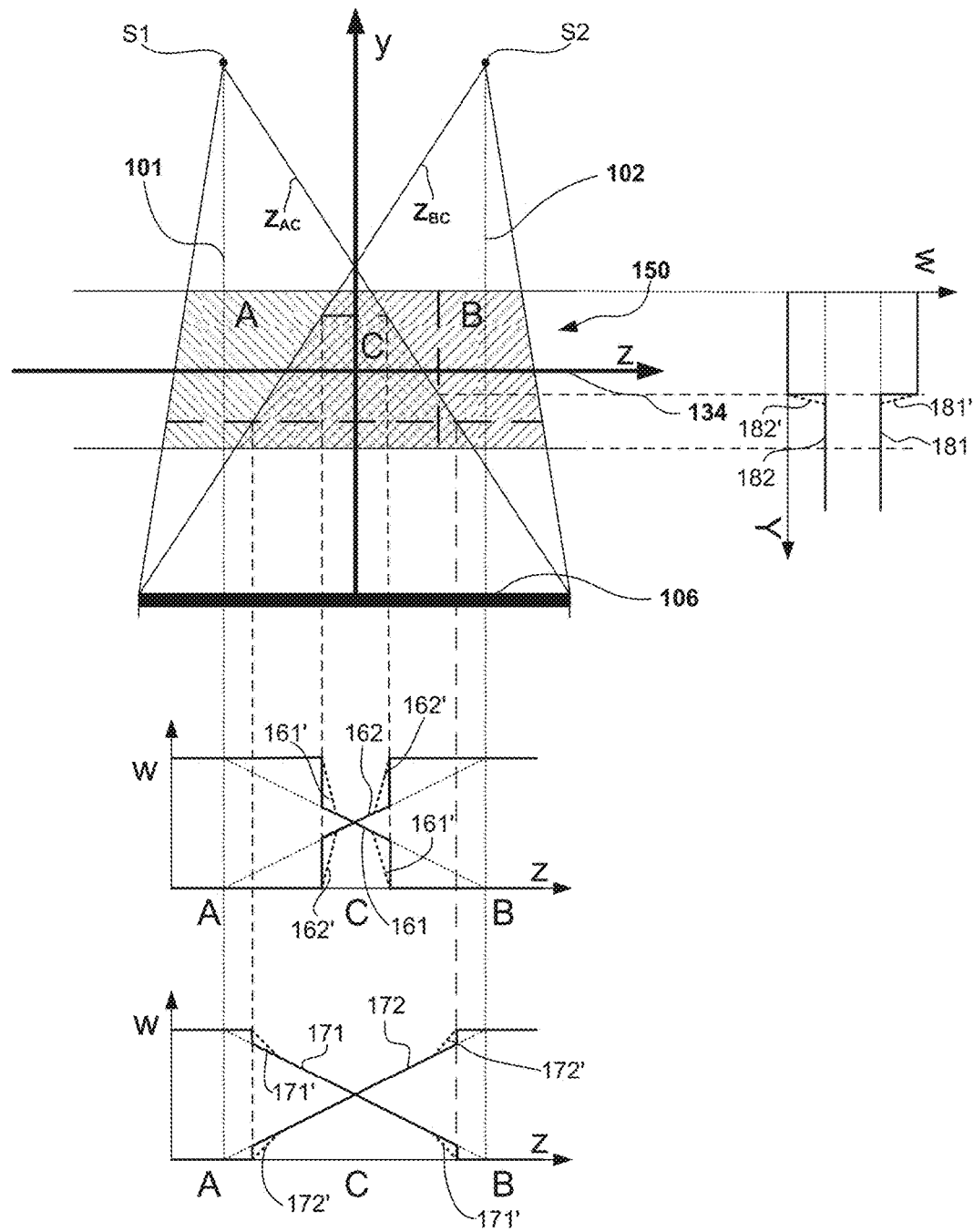
FIG. 2 is a simplified schematic illustration showing a cross sectional view of two radiation sources irradiating a volume of interest (VOI) and a corresponding example of a prior art linear weighting function used for image reconstructing.

Due to the cone shaped structure of the beams radiating from S1 and S2, the length and/or extent of region C along the Z direction increases as the Y coordinate approaches detector 106. The method described herein provides a weighting function that is continuous with no jumps regardless to the voxel position. The example in FIG. 2 illustrates that the weights 161,162 are the same or very similar to the weights in a different Y position 171,172 although the weighting zone distance changes. This causes a large discontinuity in weights between regions for Y coordinates close to the source that decreases as the Y coordinate get closer to the detector. These discontinuities result in image artifacts.

According to some embodiments of the present invention, weighting functions in region C defined along the Y direction, e.g. weighting functions 281 and 282 are also continuous monotonic functions. Typically, although the weight function is defined to be continuous along Z direction, a resultant weighting function along the Y direction, e.g. weighting functions 281 and 282 is continuous in the Y direction as well. Resultant weighting function along the Y direction, e.g. weighting functions 281 and 282 may vary in a non-linear manner within region C for a linear function along Z. It is noted that only a cross section of VOI 150 is shown for simplicity. However, typically the weight function along the X direction is also continuous.

Reference is now also made to FIG. 4 showing a simplified flow chart of an exemplary method for combining the attenuation data contribution from two sources in accordance with some embodiments of the present invention. According to some embodiments of the present invention, this combination method is used in the reconstruction process as described herein below in reference to FIG. 5. According to some embodiments of the present invention, Z coordinates of the boundaries between regions A, B and C are defined as a function of each voxel position (x, y) (block 410). According to some embodiments of the present invention, the Z coordinate of boundaries between source regions is defined by the following equations:

$$z_{AC}(x, y) = (z_{D1} - z_{S2}) \frac{\left(\sqrt{SZ^2 - x^2} - y\right)}{SD} + z_{S2} \qquad \text{Equation (1)}$$

$$z_{BC}(x, y) = (z_{D2} - z_{S1}) \frac{\left(\sqrt{SZ^2 - x^2} - y\right)}{SD} + z_{S1} \qquad \text{Equation (2)}$$

Where:
$z_{S1}$ and $z_{S2}$ are positions of S1 and S2 in the Z direction.
$z_{D1}$ and $z_{D2}$ are edge positions of a projection of VOI 150 at detector 106 which depend on the detector array size or the beam collimation.

SZ is the distance between any of S1 and/or S2 and the Z axis (axis of rotation).

SD is the distance between detector 106 and the Z axis (axis of rotation).

According to some embodiments of the present invention, the weighting function is defined as a function of the identified Z coordinates of the boundary lines (block 420). In some exemplary embodiments, when a linear weight function is defined, the slope is calculated according to boundary lines $z_{AC}(x, y)$ and $z_{BC}(x, y)$. Optionally, the weight function is defined by the following equation:

$$w(x, y) = \begin{cases} 1 & z < z_{AC} \\ 1 - \left(\dfrac{1}{z_{BC} - z_{AC}}\right)(z - z_{AC}) & z_{AC} \leq z \leq z_{BC} \\ 0 & z_{BC} < z \end{cases} \quad \text{Equation (3)}$$

It is noted that although a linear weighting function is described as an exemplary weighting function, other non-linear weighting functions that are continuous monotonic differentiable function can be used in place of the linearly defined function.

According to some embodiments of the present invention, the combined reconstructed value per view is determined by summing the weighted contribution of each source using the defined weighting function (block 430). According to some embodiments of the present invention, the final value for each voxel for a single view angle is defined by the following equation:

$$I = w*I_{s1} + (1-w)*I_{S2} \quad \text{Equation (4)}$$

Where:
$I_{S1}$ is the contribution of the projected view from S1,
$I_{S2}$ is the contribution of the projected view from S2, and
I is the combined value for a view angle θ.

Typically, combined value, I is calculated for each view angle.

Reference is now made to FIG. 5 showing a simplified flow chart of an exemplary method for reconstructing an image using a back projection method in accordance with some embodiments of the present invention. According to some embodiments of the present invention, a CT scanner scans an object with a plurality of radiation sources, e.g. S1 and S2 and in response CT projection data is received for a plurality of sources (block 510). Typically, the projection data captured by detector 106 is received by image processor 228. Typically, the projection data captured includes a plurality of views, e.g. captured over 180 degrees plus a fan angle or 360 degrees or more. Typically, the acquired data is pre-processed according to known methods (block 515). In some known reconstruction methods the data is then reordered to achieve parallel projections (block 520). In FBP reconstruction method, the data is typically convoluted with a filter function (block 520) prior to back-projecting the data on to an image volume. Typically, at the onset of back-projection, an image volume is initialized (block 525) and the CT view data and/or the contribution to each voxel in the view data is added to the initialized volume, one view at a time until reconstruction is completed (blocks 560 and 565).

Typically, a CT view is isolated from the projected data (block 530) and the view contribution of each of the plurality of sources to each image voxel is calculated and/or otherwise determined (block 535). Optionally, when a cone beam is used for scanning, an FDK method is applied for calculating the contribution of cone beam data from sources S1 and S2. According to some embodiments of the present invention and typically concurrently with single view back-projection (block 535), boundaries between volumes irradiated by different sources are identified (block 540) and corresponding weights for each image voxel in the image volume are defined (block 545).

According to some embodiments of the present invention, the Z coordinate of boundaries between volumes irradiated by different sources is identified and used to define the weights. According to some embodiments of the present invention, the contribution from each of the sources is weighted (block 550) and the weighted data from all the sources is combined (block 555). According to some embodiments of the present invention, the weighting function is defined to be continuous throughout, and monotonic and differentiable within region irradiated by a plurality of sources. Optionally, the weighting function is defined by equation (3). According to some embodiments of the present invention, the combined contribution from all sources is added to the image volume (block 560) and the process is repeated for additional CT views until all the relevant views have been added to the image volume (block 565). In some exemplary embodiments, once all the CT views have been added to the image volume, additional processing is applied to improve the reconstructed image (block 570). According to some embodiments of the present invention, when an iterative reconstruction process is used, a weighting process as described herein is used in at least one iteration of an iterative reconstruction process.

It is noted that although most of the embodiments of the present invention have been described in reference to combining data captured from two radiating sources, methods described herein can be similarly applied to systems that capture overlapping data with a single source at consecutive scans captured at different axial positions.

It is noted that although most of the embodiments of the present invention has been described in reference to combining data captured from two radiating sources, methods described herein can be similarly applied to systems that radiate with more than two sources.

It is noted that although most of the embodiments of the present invention has been described in reference to radiation sources displaced from each other in the axial direction it can be similarly applied to systems with overlapping beams with different geometries. By overlapping beams is meant that at least a portion of a volume the scanned objected is irradiated by beams from more than one source or with the same source in more than one rotation.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A method for volumetric image reconstruction of data collected from a plurality of radiation beams emitted from axially offset positions, each beam moving on a circular trajectory, the method comprising:
receiving projection data from at least two radiation beams emitted from axially offset positions, each beam radiating at a plurality of view angles over the circular trajectory;
defining a first boundary between a first region irradiated only by a first beam of the at least two radiation beams and a second region irradiated by both the first beam and a second beam of the at least two radiation beams;
defining a weighting function that is continuous throughout both the first region and the second region and is monotonic and differentiable throughout the second region and wherein the weighting function within the second region and along a direction parallel to an axis of rotation of the circular trajectory is defined as a function of distance from the first boundary; and
reconstructing a volumetric image from the data that is weighted with the weighting function.

2. The method of claim 1, wherein the first boundary is defined on a per view basis.

3. The method of claim 1, wherein the weighting function in the second region is defined to vary as a function of a length and/or extent of the second region along the direction of an axis of rotation of the circular trajectory.

4. The method of claim 1, wherein the weighting function is defined to be continuous across the first and second regions, without feathering.

5. The method of claim 1 comprising:
defining a second boundary between the second region and a third region, the third region irradiated only by the second beam; and
defining the weighting function as a function of distance from both the first boundary and the second boundary and to be continuous throughout the first region, the second region and the third region, without feathering.

6. The method of claim 5, wherein the weighting function is defined to vary linearly either from 1 to 0 or from 0 to 1 in the second region.

7. The method of claim 5, wherein the second boundary is defined on a per view basis.

8. The method of claim 1, wherein the at least two radiation beams are cone beams.

9. The method of claim 1, wherein the volumetric image is reconstructed with data collected over 180 degrees plus a fan angle of the beams.

10. The method of claim 1, wherein the volumetric image is reconstructed with data collected over less than 360 degrees.

11. The method of claim 1, the volumetric image is reconstructed with data collected over at least 360 degrees.

12. The method of claim 1, wherein a filtered back projection method is applied to reconstruct the volumetric image from the data that is weighted.

13. The method of claim 1, wherein iterative reconstruction is applied to reconstruct the volumetric image.

14. The method of claim 1, wherein one or more radiation sources and at least one detector array are mounted on a support rotor that rotates about a rotation axis of the circular trajectory, for capturing the projection data at the plurality of view angles.

15. The method of claim 1, wherein the projection data is received from at least two axially offset radiation sources that rotate together.

16. The method of claim 15, wherein the at least two axially offset radiation sources are offset in a direction of an axis of rotation of the circular trajectory.

17. The method of claim 15, wherein the projection data from the at least two axially offset radiation sources is received by a same detector array.

18. The method of claim 17, wherein the detector array alternates between receiving data from each of the at least two axially offset radiation sources.

19. The method of claim 1, wherein the data from each of the at least two radiation beams is received consecutively using a single source that is moved in the axial direction.

20. The method of claim 19, wherein the at least two radiation beams are offset in a direction of an axis of rotation of the circular trajectory.

* * * * *